United States Patent
An et al.

(10) Patent No.: US 7,175,091 B2
(45) Date of Patent: Feb. 13, 2007

(54) INSERT-TYPE BARCODE READER

(75) Inventors: Bo An, Shenzhen (CN); Chengwu Gu, Shenzhen (CN); Yingfeng Lv, Shenzhen (CN); Fu Zhang, Shenzhen (CN); Xiaoyun Ding, Shenzhen (CN)

(73) Assignee: Shenzhen Syscan Technology Co Limited (CN)

( * ) Notice: Subject to any disclaimer, the term of this patent is extended or adjusted under 35 U.S.C. 154(b) by 172 days.

(21) Appl. No.: 11/017,290

(22) Filed: Dec. 20, 2004

(65) Prior Publication Data

US 2005/0139675 A1 Jun. 30, 2005

(30) Foreign Application Priority Data

Dec. 26, 2003 (CN) .................. 2003 2 0104739

(51) Int. Cl.
*G06K 7/10* (2006.01)
(52) U.S. Cl. ............... 235/462.24; 235/436; 235/446; 235/483
(58) Field of Classification Search .......... 235/462.24, 235/435, 446, 439, 462.25, 462.43, 483, 235/485, 436
See application file for complete search history.

(56) References Cited

U.S. PATENT DOCUMENTS

| | | | | |
|---|---|---|---|---|
| 3,796,861 | A | * | 3/1974 | Hirata et al. ................. 235/474 |
| 5,491,327 | A | * | 2/1996 | Saroya ........................ 235/449 |
| 6,802,452 | B2 | * | 10/2004 | Lebaschi et al. ............. 235/476 |
| 2001/0054646 | A1 | * | 12/2001 | Hosokawa et al. ..... 235/462.25 |

* cited by examiner

*Primary Examiner*—Seung Ho Lee
(74) *Attorney, Agent, or Firm*—Anderson Kill & Olick, PC

(57) ABSTRACT

An insert-type barcode reader has a body support with an insertion slot for receiving a card with barcode. A circuit board and a CIS component module electrically connected to the circuit board with each mounted to the body support to scan and process signals. A roller is mounted to the body support for movement relative to the CIS component module to allow the card to be properly guided into the insertion slot and tightly pressed onto the CIS component for accurate scanning of the barcode on the card. Two photoelectric sensors mounted to the body support are electrically connected to the circuit board for sensing the card entering and leaving the insertion slot to control starting, running and stopping of the scanning function of the CIS component module.

9 Claims, 4 Drawing Sheets

INSERT-TYPE BARCODE READER

BACKGROUND OF THE INVENTION

1. Field of the Invention

The present invention relates to the field of barcode readers and, in particular, to an insert-type barcode reader for scanning and decoding barcode on card in an insertion slot through contact image sensors (CIS).

2. Description of the Prior Art

With wide application of barcode technologies to the field of automatic recognition in all industries, various barcode readers are needed. Existing flatbed scanner has simplex function and is not convenient for reading barcode symbols. The sheeffed scanner is complicated to manipulate and has slow scanning speed. The flatbed scanner and the sheeffed scanner cannot be readily integrated into other equipment, which restricts their function.

For a barcode on a smart card with a unified specification, there is a need for an easy-to-manipulate, high-speed-to-scan-and-decode, compact insert-type reader which can also be easily integrated into other equipment.

SUMMARY OF THE INVENTION

1. Objects of the Invention

Accordingly, it is a primary object of the present invention to overcome the aforementioned drawbacks of the prior art and provide an insert-type barcode reader which can be used separately, integrated into other equipment, easy to manipulate and with high scanning and decoding speed.

2. Features of the Invention

To achieve this object, the present invention provides an insert-type barcode reader including:
- a circuit board and a contact image sensor (CIS) component module which are electrically connected to each other;
- a body support with an insertion slot for receiving a barcode card, said circuit board and said CIS component module mounted to the body support;
- a roller which is mounted parallel to said CIS component module and on the other side of said insertion slot, said roller being moveable relative to said CIS component module, and the stationary gap between said CIS component module and said roller being narrower than the card thickness when a card with barcode is not inserted;
- A first photoelectric sensor which is fixedly mounted to said body support and electrically connected to said circuit board for sensing a card with barcode entering the insertion slot and outputting a signal to activate the CIS component module.

The present invention adopts integrative structure and all the components and parts are mounted to the body support, so the barcode reader in accordance with present invention is compact in structure and easy to be integrated into other large-scale systems. The CIS component module and the roller are mounted parallel to each other and on both sides of the insertion slot which receives a card with barcode. The gap between the CIS component module and the roller can be moveable and changeable, which is narrower than the thickness of a card with barcode when the card is not inserted. Whereby a card with barcode is accurately and no obliquely guided into the insertion slot so that the barcode symbol on the card can be vertical and pressed onto the CIS component module for proper scanning. The present invention has a first photoelectric sensor for sensing a card with barcode entering the insertion slot and activating CIS component module. Therefore, the insert-type barcode reader in accordance with present invention has a more appropriate structure and can read a barcode on a card quickly and conveniently.

DETAILED DESCRIPTION OF THE INVENTION

Figure 1:
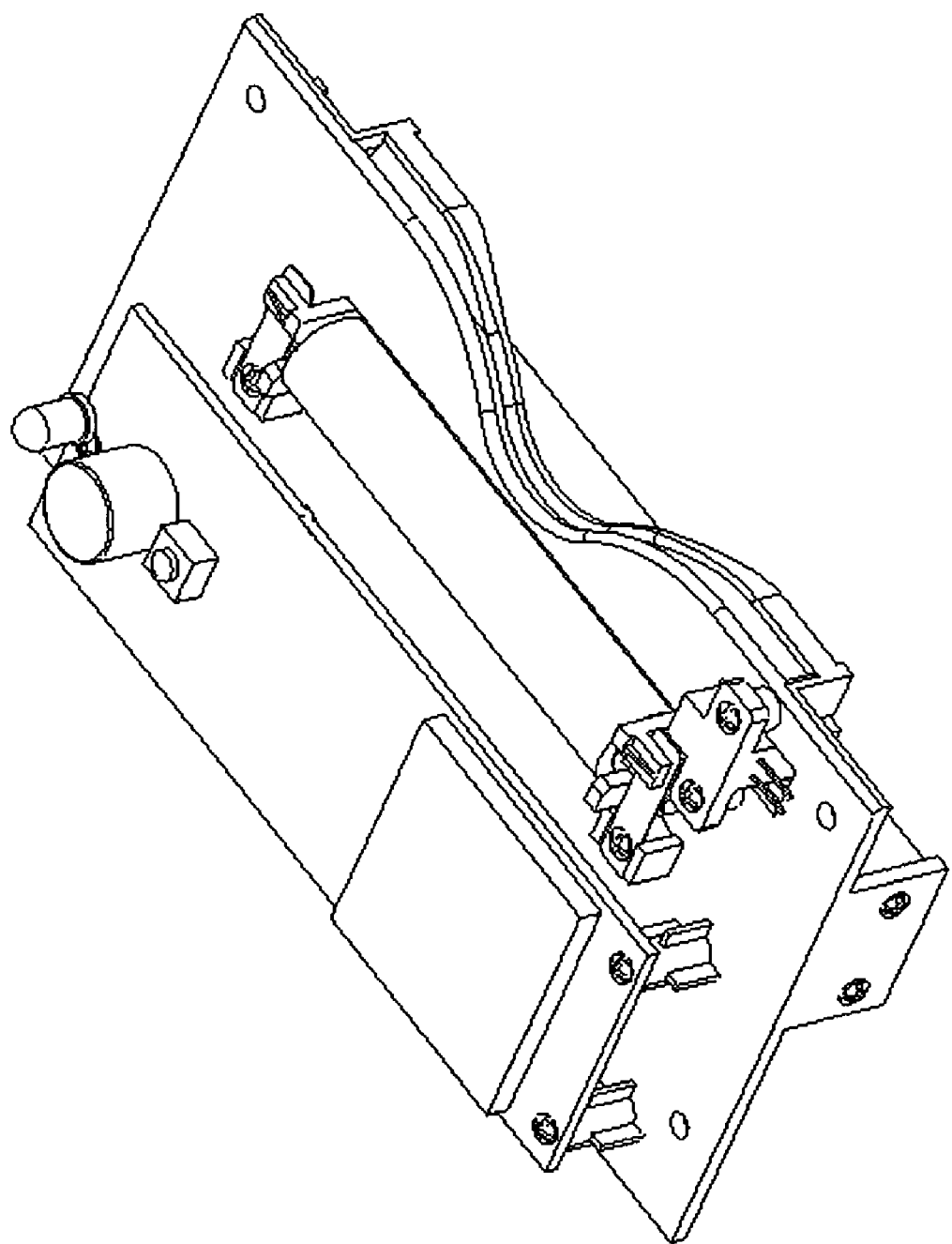
FIG. 1 is a perspective view of the assembled structure of one embodiment of an insert-type barcode reader in accordance with the present invention.
Figure 2:
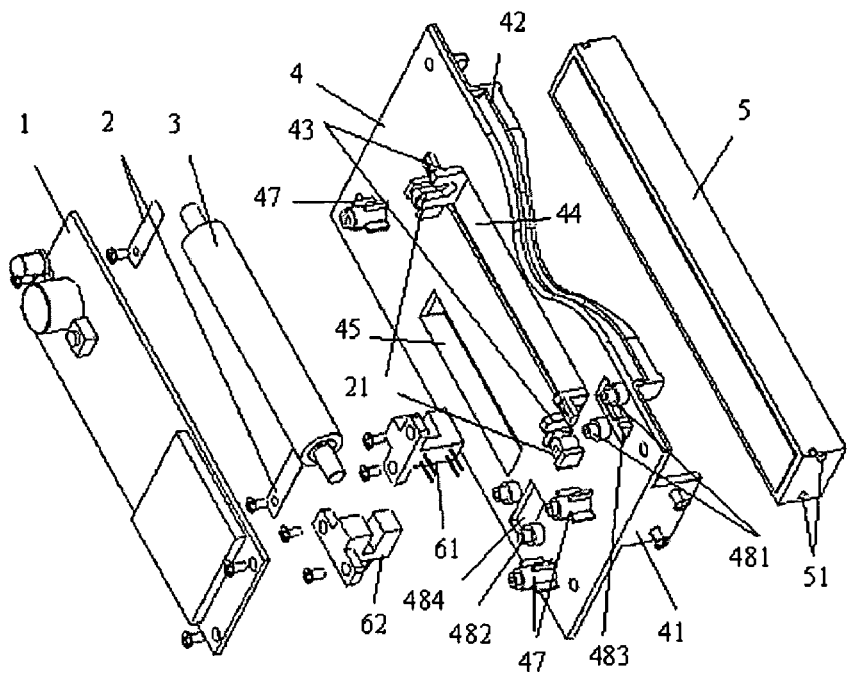
FIG. 2 and FIG. 3 are diagrams showing the disassembled structure of the embodiment of FIG. 1.
Figure 3:
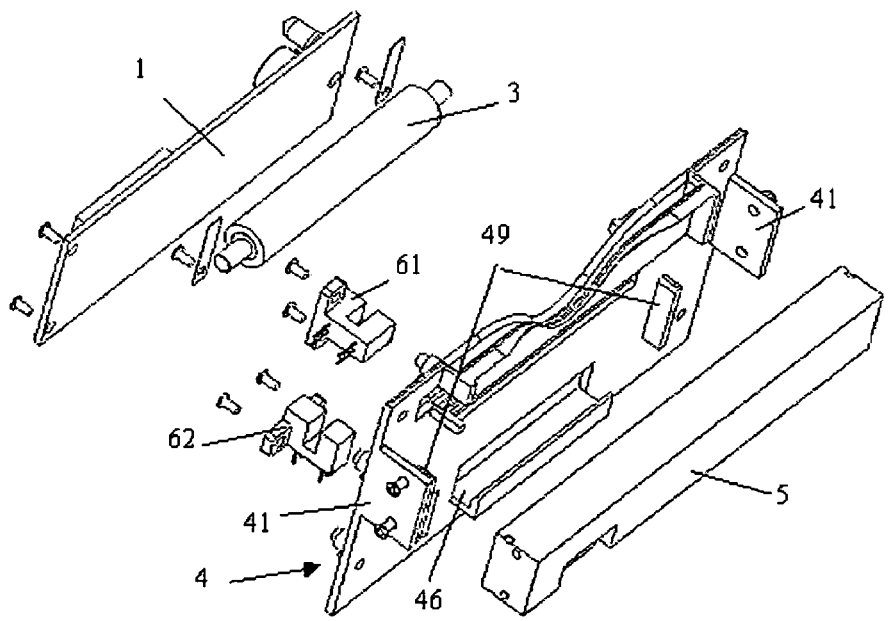

The present invention will now be described in detail in terms of its preferred embodiment and the accompanying drawings. Hereinafter, the mechanical construction of an embodiment according to the present invention will be explained in detail with reference to FIG. 1, FIG. 2 and FIG. 3. The part numbers in FIG. 2 and FIG. 3 are illustrated as follows.

1. Printed Circuit Board (PCB);
2. Spring tab;
3. Roller;
4. Body support;
5. Contact Image Sensor (CIS) component module.

And the principle constructional relation is illustrated as follows.

PCB 1 is fixedly mounted on three locating poles 47 of the body support 4 with screws.

Two spring tabs 2 are respectively mounted on two locating poles 21 of the body support 4.

The roller 3 is mounted on the two U-shaped grooves 43 of the body support 4 and, under the elastic force of the two spring tabs 2, presses the inserted card onto the surface of the CIS component module 5 through the hatch 44 of the body support 4. When a card with barcode is not inserted, the gap between the roller 3 and the CIS component module 5 should be narrower than the card thickness.

The body support 4 has an insertion slot 42 for receiving a card with barcode to be scanned.

The first photoelectric sensor 61, for sensing whether a card is inserted or not, is mounted on the locating poles 481 of the body support 4 and enters the spacing of the insertion slot 42 through the first opening 483 of the body support 4.

The second photoelectric sensor 62, for sensing whether the card is pulled out or not, is mounted on the locating poles 482 of the body support 4 and enters the spacing of the insertion slot 42 through the second opening 484 of the body support 4.

There are two symmetric lugs 41 on the margin of both sides of the body support 4. The CIS component module 5 is fixedly mounted between the two symmetric lugs 41 with screws through the mounting holes 51.

There is an L-shaped position rib 46 on the bottom of the body support 4 and it is used to limit the vertical depth of the card insertion. To meet process requirements, there is an aperture 45 on the sidewall of the body support 4 opposite to the position rib 46.

The body support 4 also has two symmetric horizontal spacing ribs 49 which allow the card to be inserted accurately and make the barcode vertically pass through the CIS component module 5 to avoid distorting scanning image. The arc design of the spacing ribs 49 can prevent a card from scratch when the card is inserted or pulled out.

When a card is inserted into the insertion slot 42, the card initially touches the roller 3. Under the elastic force of the spring tabs 2 at the both ends of the roller 3, the roller 3 is pressed onto the card surface. Since the gap between the roller 3 and the CIS component module 5 is very narrow, the barcode on the card is pressed clinging to the surface of CIS component module 5 for effective scanning.

Another embodiment of the present invention may also adopt the roller 3 mounted in a fixed position and the CIS component module 5 mounted moveable relative to the roller 3 to allow a barcode on a card to be pressed close to the surface of the CIS component module 5.

In order to prevent a card from scratch when the card is inserted or pulled out, the chamfer and burnishing techniques are processed on the two margins of the surface of the CIS component module 5 along scanning width.

The size and position design of the present invention should satisfy the following items. When a card is inserted into the reader, the outer part of the card shall be exposed enough to allow the user to pull out the card conveniently. The position of the CIS component module 5 shall be designed to allow the bottom of the card to reach the L-shaped position rib 46 so that the barcode on the card can be scanned entirely and effectively. The position of the first photoelectric sensor 61 and the second photoelectric sensor 62 shall be designed to allow the CIS component module 5 to start scanning the barcode on the card within the effective scanning scope when the bottom of the card touches the first photoelectric sensor 61 and also shall be designed to allow the CIS component module 5 to finish scanning all the barcode on the card when the bottom of the card touches the bottom of the second photoelectric sensor 62.

The first photoelectric sensor 61 and the second photoelectric sensor 62 can be interruptive type photoelectric sensor or reflective type photoelectric sensor. But the reflective type photoelectric sensor has certain requirements for the grayscale of the medium of the card to be read.

In the present invention, the spacing design for a card to be scanned is made to limit the card position in the length, width and thickness of the card directions. In the length direction, the position of the CIS component module 5 is fixed and corresponding positions of the first photoelectric sensor 61 and the second photoelectric sensor 62 are designed to guarantee an effective scan. The position of the L-shaped position rib 46 is designed to limit the insertion depth of a card with barcode so as to keep outer part of the card exposed enough to prevent the card from dropping into the reader and to be pulled out conveniently after the barcode of the card passes through the surface of the CIS component module 5.

In the width direction, the upper side of CIS component module 5 and the side wall of the insertion slot 42 restricts the spacing of the card to be scanned. The two spacing ribs 49 on the lower side of the CIS component module 5 are designed to allow the card to be inserted accurately into the insertion slot 42 and to pass through the CIS component module 5 vertically so as to avoid distorting scanning images. The arc design of the spacing ribs 49 can also prevent the card from scratching when the card is inserted or pulled out. In the thickness direction, the gap between the surface of the CIS component module 5 and the body support 4 may be set 1.4 mm because the card thickness is 0.7 mm. The width size of the CIS component module 5 along the card insertion direction shall prevent the inserted card from deviating in the insertion slot.

In order to be conveniently molded, the L-shaped position rib 46 at the bottom of slot 42 is designed to subtract corresponding proportion from the body support 4. (See the aperture 45 showed in FIG. 3). The aperture 45 provides a snap-in connection between the reader in accordance with present invention and an integrated equipment.

The roller 3 mounted on one side of the body support 4 is corresponding to the CIS component module 5 on the other side of the body support 4. The roller 3 is used to press the card onto the surface of CIS, so the positions of the roller 3 and the CIS 5 are corresponding to each other.

If the final equipment in accordance with the present invention adopts vertical type of card insertion, the impact of the big mass CIS component module 5 on the stability of the whole subsystem can not be ignored. So the relative bulky roller 3 with large diameter is used to press the card in advance when the card is inserted and adjust the card's slant to prevent the scanning image from distortion.

The spring tabs 2 at the both ends of the roller 3 cause the roller 3 elastically moveable in the insertion slot 42 of the body support 4. In order to ensure the position of the spring tabs 2, the spacing ribs are set on the locating poles 21 to prevent the spring tabs from rotating right-and-left.

The barcode reader in accordance with the present invention may have a housing and connect to a computer via external interface to work independently, and may be, without a housing, integrated into other equipment to work as a subsystem.

Figure 4:
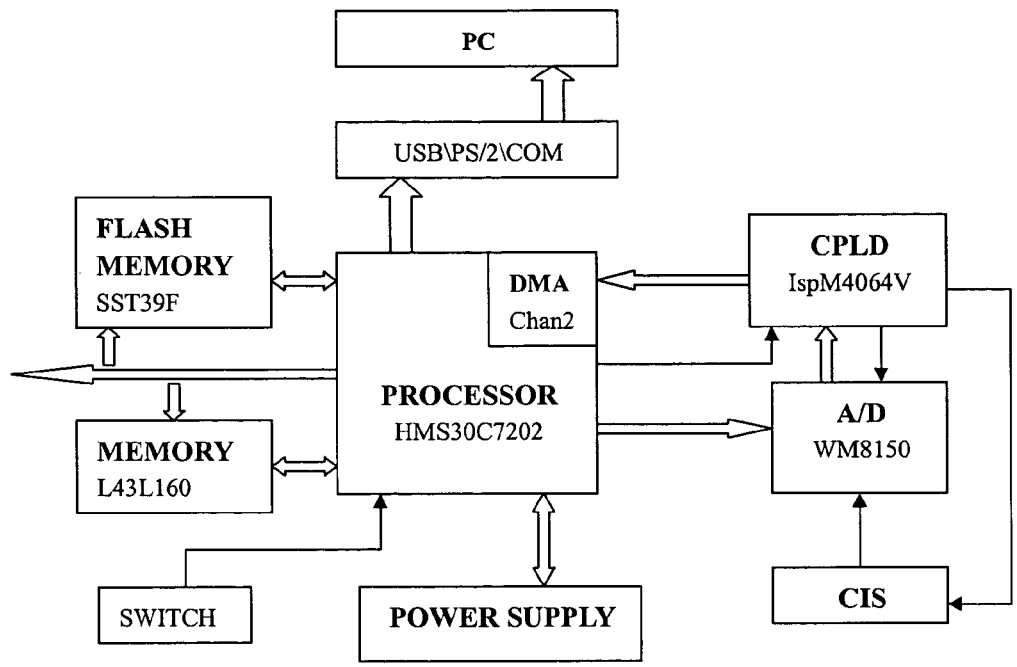
FIG. 4 is a block diagram showing the circuit structure of the embodiment of FIG. 1.

FIG. 4 is circuit diagram showing the circuit structure of the embodiment. The circuit structure of the present invention mainly includes a processor, a power supply, a memory and a flash memory which are biconnected to the processor, an optical scanning component module which includes the CIS component module 5, A/D converter and Complex Programmable Logic Device (CPLD), and an interface module for connecting with a computing unit (e.g. a personal computer) which comprises USB interface, P/S2 interface or COM interface etc.

According to the signals of the first photoelectric sensor 61 and the second photoelectric sensor 62, the processor controls the starting, running and stopping of the barcode reader. The image information obtained through CIS component module 5 scanning a barcode on a card is converted into analog level signals and then transmitted to A/D converter, e.g. WM8150, where the analog signals are converted into 16-bit digital signals. These digital signals are serially outputted to a CPLD. In the CPLD, these 16-bit serial digital signals are latched at first and then converted into 8-bit digital signals through keeping the first 8 digits and throwing away the last 8 digits. These 8-bit digital signals are transmitted in parallel through the DMA transfer to the processor for image processing and decoding operation. The decoded data is transferred to a PC via the interface module. The 8-bit digital signal can also be transferred to a computing unit directly via the interface module.

The flash memory is used to store decoding programs and the memory is used to run the decoding program, which increases the signal transmission speed, reduces the burden of the processor during the process of signal transmission and allows the image data to be collected, transmitted and processed at the same time.

The electric elements of the present invention mainly include card sensors, e.g. the first photoelectric sensor 61 and the second photoelectric sensor 62, which are used to sense the position of the card in the insertion slot for the processor controlling the scan, and an optical scanning component module, e.g., the CIS component module 5, which is used to obtain the barcode image.

The present invention may also include a switch for turning on or shut off the power of the barcode reader, a somniferous component, e.g., a buzzer, for making a cue sound which shows if decoding is successful or not, a light emitting device, e.g. LED diode, for giving out light which shows if decoding is successful or not, a processor for image processing and decoding, an AFE and an A/D converter for converting analog signals to digital signals, and a CPLD for generating sequence signal required by the AFE and the CIS and for converting serial digital signal from AFE to a 8-bit parallel signal to be decoded.

Figure 5:
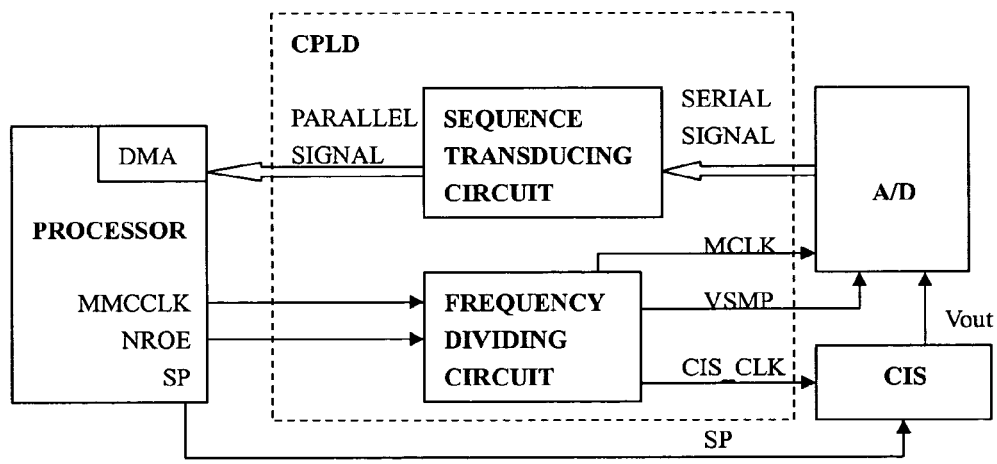
FIG. 5 is a block diagram showing the control process of the embodiment of FIG. 1.

FIG. 5 is a block diagram showing the control process of the embodiment. As shown in FIG. 5, the CPLD includes a sequence circuit and a frequency sharing circuit. At first, the processor emits master clock frequency MMCLK and a reading signal nROE which is logically converted to a CIS-CLK signal by CPLD while passing through the frequency dividing circuit of CPLD. Synchronously the CIS outputs an analog signal of pixel gray. At the same time a VSMP signal triggers AFE and the A/D converter receives the analog signal and converts it to a 16-bit digital signal. MCLK signal triggers AFE to transmit the 16-bit digital signal to the CPLD. Through the sequence circuit, the first 8 digits of the 16-bit digital signal is transmitted in the DMA manner to a buffer memory of the processor CPU. Here, SP signal is an initialting signal for a scanning period. SP signal is emitted from the processor and received by the CIS component module (optical image scanning component module). A SP period denotes scanning a row of data.

The working methods of the present invention can be employed by the signal of the first photoelectric sensor 61 initiating the CIS component module 5 and the signal of the second photoelectric sensor 62 ending the scanning of the barcode on the card when the card is inserted into the slot 42, or by the signal of the second photoelectric sensor 62 initiating the CIS component module 5 and the signal of the first photoelectric sensor 61 ending the scanning of the barcode on the card when the card is pulled out of the slot 42, or by combining above two kinds of operational modes, the signals of the first photoelectric sensor 61 and the second photoelectric sensor 62 initiating the CIS component module 5 to scan the barcode on the card when the card is inserted into the slot 42 and pulled out of the slot 42, and then combining the scanning signal to obtain all the information of the barcode.

Figure 6:
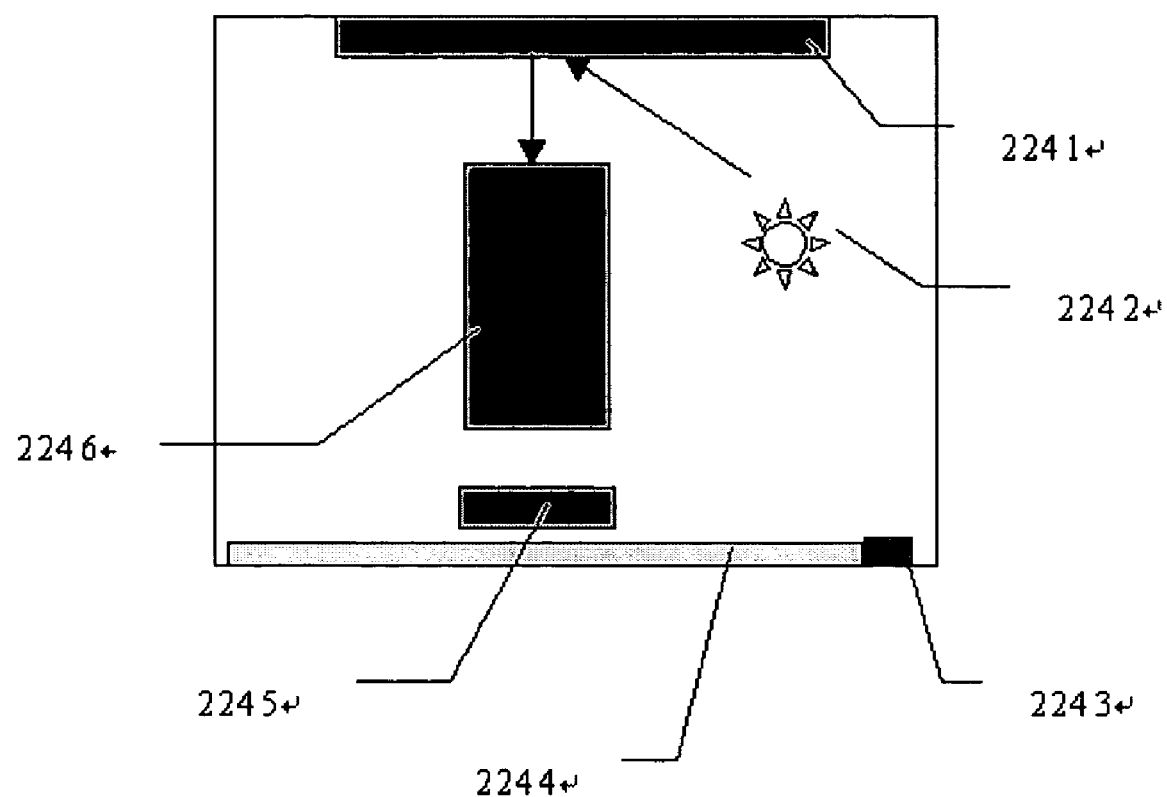
FIG. 6 is a block diagram showing the image sensor structure of the embodiment of FIG. 1.

FIG. 6 is a block diagram showing the structure of the optical scanning component module (CIS component module 5). The optical scanning component module includes a light source 2242, a connector 2243, a printed circuit 2244, a photoelectric sensor 2245, lens 2246 and a cover glass 2241. At first, the light source 2242 gives out light which passes through the cover glass 2241 and illuminates a barcode on a card to be scanned. The reflected light by the card passes through the cover glass 2241 and the lens 2246 where it is focused, and then reaches the photoelectric sensor 2245 where it is converted to electric signal. The photoelectric sensor 2245 is an array composed of multiple photodetection elements. The array can be linear or plane.

When the CIS component module 5 receives the SP signal, the light source 2242 gives out light. The reflected light by the barcode passes through the lens 2246 where it is focused, and reaches the photoelectric sensor 2245 where it is converted to electric signal. The electric signal is stored in a shift register. The signals of multiple sensitization points stored in the shift register are triggered by a CIS-CLK signal to be outputted sequentially.

The working process of the present invention includes following steps:

Insert a card with barcode into the slot 42;

The first photoelectric sensor 61 is triggered to initiate the CIS component module 5 to scan;

The roller 3 presses the card onto the window of the CIS under the force of the spring tabs 2;

the CIS receives the reflected light from the card, generates analog image signals, and transmits the analog image signals to the A/D converter;

A/D converter converts the analog image signals into the digital image signals and then transfers the digital image signals o the processor for decoding.

A card is restricted vertically by the position rib 46 and horizontally by the two spacing ribs 49 when the card is inserted; The second photoelectric sensor is triggered to finish the scanning when the card continues to be inserted;

The buzzer can give out information to show if the scanning is successful or not. If not successful, the software of the present invention can determine if it is required to scan the card again when the card is pulled out. While rescanning the card, the CIS component module 5 is initiated to scan by the second photoelectric sensor and triggered to end the scan by the first photoelectric sensor triggers.

What is claimed is:

1. An insert-type barcode reader comprising:
   a body support with an insertion slot for receiving a card with barcode;
   a circuit board mounted to said body support;
   a contact image sensor (CIS) component module mounted to said body support and electrically connected to said circuit board;
   a roller mounted to said body support in a position parallel to said CIS component module and at the other side of said insertion slot, said roller being moveable relative to the CIS component module, wherein a stationary gap between said CIS component module and said roller is narrower than the thickness of a card with barcode when said roller is stationary; and
   a first photoelectric sensor mounted to said body support and electrically connected to said circuit board for sensing a card with barcode entering said insertion slot and for outputting a signal to activate said CIS component module and further comprising
   two spring tabs respectively mounted on two locating poles of said body support;
   a hatch slotted; and
   two U-shaped grooves slotted in said body support;
      whereby said two spring tabs pressing said roller mounted to said two U-shape grooves into said insertion slot through said hatch.

2. The insert-type barcode reader according to claim 1, further comprising a second photoelectric sensor mounted to said body support and electrically connected to said circuit board for sensing a card with barcode leaving said insertion slot.

3. The insert-type barcode reader according to claim 2, further comprising two symmetric horizontal spacing ribs affixed to said insertion slot of the body support for restricting the right and left position of a card with barcode during insertion of the card.

4. The insert-type barcode reader according to claim 3, further comprising a L-shaped position rib affixed to said insertion slot of the body support for limiting the vertical depth of the card insertion.

5. The insert-type barcode reader according to claim 4, further comprising an aperture on the sidewall of said body support, said aperture is opposite to said L-shaped position rib for providing the insert-type barcode reader with a snap-in connection to other equipment.

6. The insert-type barcode reader according to claim 5, wherein said circuit board comprises:
   a processor for controlling the starting, running and stopping of the barcode reader according to the signals of said first photoelectric sensor and said second photoelectric sensor;
   a power supply connected to said processor;
   a memory for running a decoding program;
   a flash memory for storing a decoding program;
   an A/D converter for converting analog signals to digital signals;
   a Complex Programmable Logic Device (CPLD) for generating sequence signals required by AFE and CIS and for converting AFE sequential signals to 8-bit parallel signals; and
   an interface module for connecting the barcode reader to a computing unit;
   whereby the CIS component module scans a barcode on a card and obtains a analog signal, the analog signal is converted to a 16-bit digital signal by said A/D converter and passed to said CPLD, the outputted 16-bit digital signal from said A/D converter is transformed by said CPLD to a 8-bit parallel signal and transmitted in the manner of DMA to said processor, said memory and said flash memory for image processing and decoding operation, and a decoded result is transmitted to the computing unit via said interface module.

7. The insert-type barcode reader according to claim 6, wherein the 8-bit parallel signal outputted by said CPLD is transmitted directly to said computing unit via said interface module for image processing and decoding operation.

8. The insert-type barcode reader according to claim 7, wherein said CIS component module comprises:
   a light source for giving out light and for illuminating a card with barcode;
   a connector connected to said circuit board for outputting analog signal;
   a photoelectric sensor array for accumulating optical signals obtained from scanning the barcode on the card;
   a printed circuit for controlling said light source, said connector and said photoelectric sensor array to work harmoniously; and
   a lens array for focusing light reflected by the card on said photoelectric sensor array.

9. The insert-type barcode reader according to claim 7, wherein said CIS component module comprises:
   a light source for giving out fight and for illuminating a card with barcode;
   a connector connected to said circuit board for outputting analog signal;
   a photoelectric sensor array for accumulating optical signals obtained from scanning the barcode on the card;
   a printed circuit for controlling said light source, said connector and said photoelectric sensor array to work harmoniously; and
   a lens array for focusing light reflected by the card on said photoelectric sensor array.

* * * * *